United States Patent Office 3,515,715
Patented June 2, 1970

3,515,715
QUATERNIZED PYRAZOLYLAZO DYES
James M. Straley, John G. Fisher, and David J. Wallace, Kingsport, Tenn., assignors to Eastman Kodak Company, Rochester, N.Y., a corporation of New Jersey
No Drawing. Filed Jan. 23, 1967, Ser. No. 611,165
Int. Cl. C09b 29/36; C07d 49/20
U.S. Cl. 260—163    8 Claims

ABSTRACT OF THE DISCLOSURE

Pyrazolylazo compounds, prepared by diazotizing a 3-aminopyrazole, coupling the diazonium salt formed with an aniline coupling component and quaternizing the pyrazolylazo compound, and the use of such compounds as dyes for acrylic, modacrylic and acid modified textile materials. The disclosed compounds give red to violet dyeings having improved fastness to light on such textile materials.

---

This invention relates to novel pyrazolylazo compounds which are useful as dyes for acrylic and modacrylic textile fibers, yarns and fabrics.

The novel pyrazolyl compounds of the invention have the general formula (I) 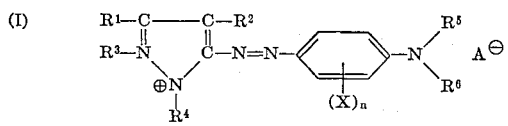

wherein $R^1$ represents hydrogen, cyano or lower alkyl, e.g. having up to about 4 carbon atoms, such as, for example, methyl, ethyl, propyl, isopropyl, butyl, isobutyl, etc.;

$R^2$ represents cyano, carbamoyl, nitro, or lower alkoxycarbonyl, e.g. having up to about 5 carbon atoms, such as, for example, methoxycarbonyl, ethoxycarbonyl, propoxycarbonyl, isopropoxycarbonyl, butoxycarbonyl, etc.;

$R^3$ represents lower alkyl, e.g. alkyl having up to about 4 carbon atoms or benzyl.

$R^4$ represents lower alkyl, e.g. alkyl having up to about 4 carbon atoms, lower hydroxyalkyl, a phenyl group, or a phenylsulfonyl group;

$R^5$ represents hydrogen or an alkyl group;

$R^6$ represents hydrogen, an alkyl group, or a phenyl group;

X represents hydrogen, halogen, a lower alkyl group, a lower alkoxy group, a lower alkylcarbonylamido or a lower alkylsulfonamido group;

n represents 1 or 2, and A is an anion.

The compounds of the invention impart bright colors, having excellent fastness properties, e.g. lightfastness, to acrylic, modacrylic and acid modified polyester textile materials when applied thereto by conventional methods. When used to dye the aforesaid textile materials, the novel compounds give dyeings which are superior to dyeings obtainable from structurally related but chemically distinct compounds. For example, the compounds of the invention give dyeings having properties superior to dyeings obtained according to British Pat. 888,167.

The phenyl group that can be represented by $R^4$ can be unsubsituted or substituted, for example, with lower alkyl, lower alkoxy, halogen, nitro, etc. Examples of the phenyl groups represented by $R^4$ are phenyl, p-tolyl, p-chlorophenyl, and p-nitrophenyl. The phenyl moiety of the phenylsulfonyl groups that $R^4$ can represent similarly can be unsubstituted or substituted with the substituents described above. Typical phenylsulfonyl groups represented by $R^4$ are phenylsulfonyl, p-tolylsulfonyl, p-chlorophenylsulfonyl, and p-nitrophenylsulfonyl. Examples of the lower hydroxyalkyl groups represented by $R^4$ are 2-hydroxyethyl, 3-hydroxypropyl, 2,3-dihydroxypropyl, etc. Preferably $R^4$ represents lower alkyl, especially methyl, or phenylsulfonyl.

The alkyl groups represented by $R^5$ and $R^6$ and the phenyl group represented by $R^6$ are well known to those skilled in the art of azo dyes. The alkyl groups represented by $R^5$ and $R^6$ can be straight or branch chain, substituted or unsubstitued alkyl having up to about 8 carbon atoms. Typical of the unsubstituted alkyl groups are methyl, ethyl, propyl, isopropyl, hexyl, 2-ethylhexyl, heptyl, octyl, etc. Typical substituents that can be present on the substituted alkyl groups represented by $R^5$ and $R^6$ are hydroxy, halogen, nitro, cyano, thiocyano, lower alkoxy, lower thioalkyl, lower alkanoyloxy, lower alkoxycarbonyl, lower alkoxycarbonyloxy, lower alkylsulfonyl, lower alkylsulfonamido, carbamoyl, lower alkyl substituted carbamoyl, sulfamoyl, lower alkyl substituted sulfamoyl, dicarboximido, phenyl, phenoxy, benzoyl, etc. Preferred alkyl groups include substituted and unsubstituted lower alkyl. Since some of the susbtituents described above that can be present on the substituted alkyl group contain lower alkyl moieties, preferred substituted alkyl groups, when substituted with such substituents, can contain up to about 8 carbon atoms, e.g., butoxybutyl. Examples of the substituted alkyl groups represented by $R^5$ and $R^6$ are 2-chloroethyl, 3-bromopropyl, 2-hydroxyethyl, 2,3-dihydroxypropyl, 2-hydroxy-3-chloropropyl, 2-methoxyethyl, 3-cyanopropyl, 2-thiocyanoethyl, 2-methylthioethyl, 2-acetoxyethyl, 2-propionoxyethyl, 2-methoxycarbonylethyl, 2-ethoxycarbonylethyl, 3-ethoxycarbonyloxypropyl, 2-methylsulfonamidoethyl, 3-butylsulfonylpropyl, 2-carbamoylethyl, 2-N-ethylcarbamoylethyl, 3-N,N-dimethylcarbamoylpropyl, 2-sulfamoylethyl, 2-N,N-dimethylsulfamoylethyl, benzyl, 2-p-tolylethyl, 2-phenoxyethyl, 3-succinimidopropyl, 2-phthalimidoethyl, etc.

The phenyl group that can be represented by $R^6$ includes both substituted and unsubstituted phenyl. Examples of the substituents that can be present on the phenyl group are lower alkyl, e.g. ethyl, methyl, butyl; lower alkoxy, e.g. methoxy, ethoxy, propoxy, butoxy; halogen, e.g. chloro, bromo; nitro, cyano, etc. Typical of the substituted phenyl groups that can be represented by $R^6$ are p-tolyl, p-anisyl, p-chlorophenyl, m-nitrophenyl, etc.

Illustrative of the alkyl and alkoxy groups represented by X are methyl, ethyl, propyl, isopropyl, butyl, and isobutyl and methoxy, ethoxy, propoxy and butoxy. Chloro and bromo are typical of the halogen atoms which X can represent. Methylsulfonamido, ethylsulfonamido, propylsulfonamido, butylsulfonamido, acetamido, propionamido, and butyramido are typical of the lower alkylsulfonamido and lower alkylcarbonylamido groups that X can represent. When n is 2, the groups represented by X can be the same or different.

A preferred group of the compounds of our invention have the formula (II) 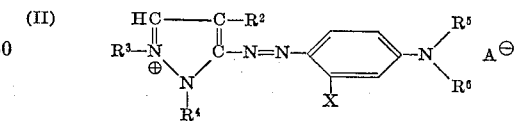

wherein $R^2$ represents cyano, carbamoyl, lower alkoxycarbonyl, or nitro, $R^5$ represents lower alkyl or benzyl, $R^4$ represents lower alkyl or phenylsulfonyl, $R^3$ and $R^6$ each represents lower alkyl or lower alkyl substituted with hydroxy, chloro, bromo, cyano, or lower alkanoyloxy, X represents hydrogen or lower alkyl and A represents a bromide, iodide, chloride, lower alkyl sulfate, p-toluene sulfonate, or benzene sulfonate ion.

Since the color of the novel compounds is attributable to the conjugated pyrazolyl-azo-phenyl system, the groups represented by $R^1$, $R^2$, $R^3$, $R^4$, $R^5$, $R^6$ and X as defined in the above general formulae do not affect the usefulness of the compounds as dyes for the textile materials described above. These groups function primarily as auxochrome groups to control the shade of the compounds.

In general, the pyrazolyazo compounds of the invention are prepared by diazotization of appropriate aminopyrazoles, coupling of the diazotized aminopyrazole with an appropriate coupling component and quaternization of the resulting azo compound.

The aminopyrazoles used in the preparation of the compounds of this invention are known compounds and are conventionally prepared as described in the chemical literature. Thus typical preparations of pyrazoles characterized by the formula (III)
$$R^1-C\underset{\underset{\underset{R^4}{|}}{N}}{\overset{\|}{\underset{N}{C}}}C-R^2$$
$$\phantom{R^1-C\underset{\underset{R^4}{|}}{N}}C-NH_2$$

wherein $R^1$ and $R^2$ are defined above and $R^4$ is hydrogen or is as defined above, are illustrated by the following:

(1) For aminocyanopyrazoles: Reaction of ethoxymethylene malononitrile with hydrazine or a derivative thereof, i.e. $RNHNH_2$ where R=alkyl, substituted alkyl, aryl or substituted aryl, etc. Preparation of ethoxymethylene malononitrile is illustrated in J.A.C.S. 65, 2224;

(2) For aminocarbamoylpyrazoles: By hydrolysis of the corresponding cyanopyrazole as described in (1) above;

(3) For aminoalkoxycarbonylpyrazoles: Reaction of an ethoxymethylene cyanoalkylacetate with an appropriate hydrazine. Preparation of ethoxymethylene cyanoethylacetate for example is illustrated in Ber., 38, 51 and reaction thereof with hydrazine and phenyl hydrazine is described in Helv. Chim. Acta, 39, 986;

(4) For aminotropyrazoles: By rearrangement of an isoxazole in the presence of an appropriate hydrazine as described in Gazz. Chem. Ital, 72, 537 and Chem. Abs., 38, 4597;

(5) For aminodicyanopyrazoles: By reaction of tetracyanoethylene and an appropriate hydrazine as described in J. Org. Chem., 29, 1915.

Exemplary aminopyrazoles corresponding to Formula II, prepared as set forth above, which are diazotized and coupled with appropriate conventional coupling components include 3-amino-4-cyanopyrazole,
3-amino-4-nitropyrazole,
3-aminopyrazole-4-carboxamide,
3-amino-4-cyano-2-phenylpyrazole,
3-amino-4,5-dicyano-2-phenylsulfonyl-pyrazole,
3-amino-2-phenylpyrazole-4-carboxamide,
3-amino-4-nitro-2-phenylpyrazole,
3-amino-5-methyl-4-nitro-2-phenylpyrazole,
3-amino-4-cyano-2-methylpyrazole,
3-amino-4-cyano-2,β-hydroxyethylpyrazole,
3-amino-4-cyano-2,p-nitrophenylpyrazole,
3-amino-2,p-chlorophenylpyrazole-4-carboxamide,
3-amino-4-cyano-2,p-tolylpyrazole,
3-amino-4,5-dicyano-2-methylpyrazole,
3-aminopyrazole-4-carboxylic acid methyl ester,
3-amino-2-phenylpyrazole-4-carboxylic acid methyl ester,
3-amino-2-phenylsulfonylpyrazole-4-carboxylic acid methyl ester,
3-amino-2-methylpyrazole-4-carboxylic acid methyl ester,
3-aminopyrazole-4-carboxylic acid ethyl ester,
3-aminopyrazole-4-carboxylic acid isopropyl ester,
3-amino-2-phenyl-4-carboxylic acid isopropyl ester,
3-amino-2-phenylsulfonylpyrazole-4-carboxylic acid isopropyl ester and the like.

The aniline coupling components, which are combined with the above-described diazotized aminopyrazoles to obtain the compounds which are subsequently quaternized to form the novel compounds of the invention, are known compounds characterized by the formula (IV)
$$H-\underset{(X)_n}{\left\langle\phantom{XXX}\right\rangle}-N\underset{R^6}{\overset{R^5}{\diagup}}$$

wherein $R^5$, $R^6$, X and $n$ are as defined in Formula I, and include

N,N-dimethylaniline,
N,N-diethylaniline,
N,N-dimethyl-m-toluidine,
N,N-dimethyl-m-chloroaniline,
N,N-diethyl-m-anisidine,
N,β-cyanoethyl-N-ethylaniline,
N,β-cyanoethyl-N-ethyl-m-toluidine,
N,β-hydroxyethyl-N-ethylaniline,
N,N-di-β-hydroxyethylaniline,
N,N-di-β-hydroxyethyl-m-chloroaniline,
N,O-cyanoethyl-N,β-hydroxyethylaniline,
N,β-cyanoethyl-N,β-hydroxyethyl-m-toluidine,
N,N-di-β-cyanoethylaniline,
N,β-chloroethyl-N-ethylaniline,
N,N-di-β-chloroethyl-m-toluidine,
N,β-cyanoethyl-N,β-succinimidoethyl-m-toluidine,
N,β-chloro-gramma-hydroxypropyl-N-ethyl-m-toluidine,
N,N-di-β-succinimidoethylaniline,
N-β-carbethoxyethyl-N-ethylaniline,
N,β-acetoxyethyl-N-ethylaniline,
N,β-cyanoethyl-N-methylaniline,
N,β-chloroethyl-N,β-cyanoethyl-m-toluidine,
N-ethyl-N,β-methanesulfonamidoethyl-m-toluidine,
N,N-di-β-hydroxyethyl-2-methoxy-5-acetamidoanitine,
N,N-di-β-hydroxyethyl-2-methoxy-5-methylsulfonamidoaniline and the like.

Examples of the anions represented by A include $Cl^-$, $Br^-$, $I^-$, $CH_3SO_4^-$, $C_6H_5SO_3^-$, etc., the anion depending upon the method of preparation utilized and the particular quaternizing agent employed. The anion does not affect the utility of the compounds of the invention as dyes nor does it affect the dye affinity of the compounds for polyacrylonitrile textile materials. When the compounds are used to dye polyacrylonitrile textile material, the anion becomes associated wtih a positively charged ion derived from the polyacrylonitrile and is removed from the dye cation and polycarylonitrile textile material, either in the dyebath or in a subsequent washing of the dyed polyacrylonitrile textile material. Since the cation of a cationic azo dye is responsible for the color of the compound, the particular anion associated with the cation is not important.

Suitable quaternizing agents that can be used in preparing the novel compounds of the invention are the dialkyl sulfates, the alkyl halides, the aralkyl halides, the alkyl esters of aryl sulfonic acids, etc. Specific quaternizing agents include, for example, dimethyl sulfate, diethyl sulfate, ethyl bromide, methyl iodide, ethyl iodide, benzyl chloride, benzyl bromide, methyl-p-toluene sulfonate, ethyl-p-toluene sulfonate and ethyl benzenesulfonate.

The following examples will serve to illustrate the preparation of representative intermediates and pyrazolylazo compounds of the invention.

PREPARATION OF INTERMEDIATES

Example 1

Preparation of ethoxymethylene methylcyanoacetate.— A mixture of methylcyanoacetate (99 g.), triethylorthoformate (148 g.) and acetic anhydride (220 g.) is heated at total reflux in a distillation flask with a twelve inch Vigreux column for three hours. Take off of refluxing vapors is begun and continued at atmospheric pressure until the head temperature reaches 120° C. After cooling the system is put under vacuum and the product collected at 99° C./0.3 mm. after discarding a small forerun. A yield of 67.5% is obtained; the refractive index of the liquid is 1.4842 at 20° C.

Example 2

Preparation of 3-aminopyrazole-4-carboxylic acid methyl ester.—Hydrazine hydrate (6.5 g.) is added slowly to a solution of ethoxymethylene methylcyanoacetate (20.2 g.) in absolute ethanol (100 ml.). A mild exothermic reaction occurs. The solution is heated six hours at reflux and then most of the solvent is distilled off. On cooling, a 96% yield of product melting at 135–136° C. is obtained.

Example 3

Preparation of 3-amino-2-phenylpyrazole-4-carboxylic acid methyl ester.—Phenylhydrazine (14.04 g.) is added to a solution of ethoxymethylene methylcyanoacetate (20.2 g.) in a absolute ethanol (100 ml.). After refluxing for six hours the reaction solution is cooled and the product is collected and recrystallized from absolute ethanol (100 ml.). The yield of recrystallized material is 97.5%, melting at 149.5–150.5° C.

*Analysis.*—Theory (percent): C, 60.8; H, 5.1; N, 19.3. Found (percent): C, 60.96; H, 5.41; N, 19.29.

Example 4

Preparation of ethoxymethylene isopropylcyanoacetate.—This preparation is run exactly as Example 1, substituting isopropylcyanoacetate for methylcyanoacetate. The product boils at 104° C./0.4 mm., $n_D^{20}$ 1.4710.

Example 5

Preparation of 3-amino-2-phenylsulfonylpyrazole-4-carboxylic acid isopropyl ester.—Benzenesulfonylhydrazide (13.6 g.) and ethoxymethylene isopropylcyanoacetate (14.6 g.) are dissolved in absolute ethanol (80 ml.). The solution is heated at reflux for six hours, part of the solvent is distilled off and the product is filtered off after cooling. A yield of 13.5 g. of the product, melting at 101–3° C., is obtained.

Example 6

Preparation of 3-amino-4-cyano-2-phenylsulfonylpyrazole.—Benzenesulfonylhydrazide (9.35 g.) is dissolved in absolute ethanol by warming. Ethoxymethylene malononitrile (6.63 g.) is added to the solution at such a rate that a gentle boil is maintained. The reaction solution is heated for one hour after addition is completed. The product which separates on cooling is collected and dried. A 61% yield of the product, melting at 174–5° C., is obtained. Recrystallization from ethanol raises the melting point to 1882–3° C.

*Analysis.*—Theory (percent): C, 48.37; H, 3.25; N, 22.57. Found (percent): C, 48.38; H, 3.37; N, 22.47.

PREPARATION OF THE DYES

Example 7

Ten ml. of 1:5 acid (1 part propionic: 5 parts acetic) is added to nitrosylsulfuric acid prepared from sodium nitrite (0.72 g.) and sulfuric acid (5 ml.). This solution is cooled to 3° C. and 3-amino-4-cyano-2-phenylsulfonylpyrazole (2.48 g.) added keeping the temperature at 5° C. or below. A second 10 ml. portion of 1–5 acid is added at the same temperature and the diazotization is completed by stirring for two hours at 3 to 5° C. This solution is added to an internally ice cooled solution of N,N-dimethylaniline (1.21 g.) in dilute hydrochloric acid. The pH of the coupling mixture was adjusted to 4–5 by addition of solid ammonium acetate taking care that the temperature did not rise above 10° C. After the coupling was complete, water was added and the azo dye collected on a funnel, washed well with water and dried at room temperature.

Example 8

The dried dye cake of Example 7 is heated in dimethyl sulfate (25 ml.) until quaternization is complete, as determined by thin layer chromatography in the following manner: A test sample of the reaction mixture is dissolved in a small amount of methanol and spotted on a chromatographic plate. After allowing to dry the strip is developed in chloroform-methanol (80–20) solution. Under these conditions only the unquaternized dye moves from the original spot.

The red dimethyl sulfate solution is drowned in ether and after a few minutes standing the liquid is decanted from the sticky dye precipitate. Water is added and the dye is dissolved by heating, filtered hot and precipitated by addiiton of sodium iodide after allowing to cool. It is collected on a funnel, washed with water and dried. This cation imparts red shades to acrylic fibers and has the formula

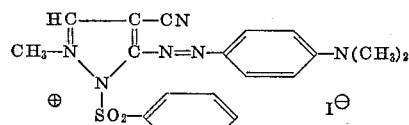

Example 9

When the aminopyrazole compound of Example 7 is replaced by 3-amino-4-cyanopyrazole (1.08 g.), then the corresponding intermediate azo dye is obtained. Part of the dried dye cake (1.0 g.) of this dye is dissolved in N-methylpyrrolidinone (15 ml.) and dimethyl sulfate (1 ml.) is added. The quaternization solution is heated at 95–100° C. until complete as shown by thin layer chromatography of a test sample. The solution is poured into water (150 ml.) and the dye is precipitated by addition of solid sodium iodide. This cation imparts bluish-red shades to acrylic fibers and has the structure:

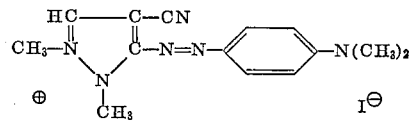

Methylation occurs during quaternization on the nitrogen atom in the 1-position.

Example 10

The azo dye (2.0 g.) prepared from 3-amino-2-phenylsulfonylpyrazole-4-carboxylic acid methyl ester and N,N-dimethylaniline, prepared as described in Example 7, is heated in methyl-p-toluene sulfonate for four hours at 95–100° C. The red solution is drowned with good stirring in ether. After a few minutes standing the ether is decanted from the sticky precipitate of the quaternary dye. Water (800 ml.) and acetic acid (3 ml.) are added and the dye is dissolved by heating. A small amount of charcoal is added and the solution is filtered and allowed to cool. The cation is precipitated by addition of potassium iodide. It dyes acrylic fibers in red shades and has the formula:

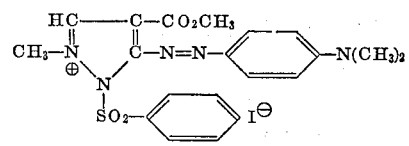

Example 11

When the coupling component, N,N-dimethylaniline of Example 7, is replaced by N,β-cyanoethyl-N-ethyl-m-toluidine (1.88 g.) and the coupling carried out in the same manner, then a different azo dye is obtained. The dried dye cake is quaternized as described in Example 8 and the dye of the following structure is obtained. This cation imparts fast red shades to acrylic fibers.

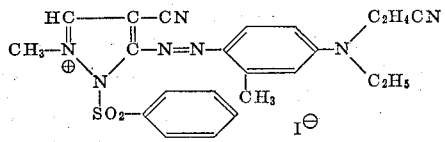

Example 12

An amount of 1.41 g. of 3-aminopyrazole-4-carboxylic acid methyl ester is diazotized and coupled to N,N-dimethylaniline (1.21 g.) as described in Example 7. Part of this dye cake (1.0 g.) is dissolved in chlorobenzene (50 ml.), magnesium oxide (0.2 g.) and dimethyl sulfate (1.5 ml.) are added, the reaction mixture is stirred and heated at reflux for three hours and then allowed to cool. The quaternary methosulfate of the dye is filtered off, dissolved in water by heating and filtered hot to remove the magnesium salts as well as any unquaternized dye. The cooled filtrate is treated with sodium iodide and the dye is collected, washed with a little water and dried at room temperature. This cation imparts red shades to acrylic fibers and has the structure:

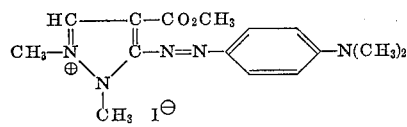

In accordance with the procedures described in Examples 1–12, the amines and coupling components listed in the examples of the following table are coupled and the resulting azo compounds are quaternized to yield the corresponding pyrazolylazo compounds. When the 3-aminopyrazoles of the following examples are unsubstituted in the 2-position, the resulting azo compound is alkylated at the 2-position of the 3-aminopyrazole when it is treated with the quaternizing agent.

The pyrazolylazo compounds of the invention can be used for dyeing acrylic and modacrylic polymer fibers, yarns and fabrics giving yellow shades when applied thereto by conventional dye methods. Acrylic textile materials are those which consist of at least 85% acrylonitrile and modacrylic textile materials are those consisting of at least 35% but less than 85% acrylonitrile. The compounds of the invention also give excellent dyeings on acid-modified acrylic textile materials such as the sulfonate modified acrylic fibers described in U.S. Pats. 2,837,500, 2,837,501 and 3,043,811. The novel compounds can also be used to dye sulfonate modified polyester fibers such as are described in U.S. Pat. 3,018,272. Examples of the textile materials that are dyed with the compounds of the invention are those sold under the tradenames "Orlon," "Orlon 42," "Verel," "Acrilan," "Dynel," "Creslan" and "Dacron 64." In general, the compounds, when used as dyes on the described textile materials, exhibit excellent fastness, for example, to washing, to alkaline perspiration, gas (atmospheric fumes) and light.

As described above, the present pyrazolylazo compounds are characterized by a structure which renders them chemically distinct from other known compounds. This distinctive structure imparts unexpected properties to the present compounds, especially when they are used as dyes for dyeing acrylic and modacrylic textile materials, including affinity for acrylic fibers, and satisfactory brightness and fastness to light. Thus, we have found the compounds of the invention to possess excellent fastness properties when used as dyes on acrylic and modacrylic textile materials when such dyeings are tested by methods such as described in the A.A.T.C.C. Technical Manual, 1965 edition. The compounds of the invention are not necessarily equivalent when used as dyes for acrylic and modacrylic textile materials. For example, the degree of affinity will vary depending upon the textile material being dyed and the formula of the particular dye compounds used.

Textile materials dyed by the compounds of the invention are characterized by containing at least about 35%

| Example No. | Diazotized amine | Coupling component | Quaternizing agent | Color on acrylic fibers |
|---|---|---|---|---|
| 13 | 3-amino-4-cyano-2-phenyl-pyrazole | N,N-dimethylaniline | (CH₃)₂SO₄ | Violet. |
| 14 | do | N,β-cyanoethyl-N-ethyl-m-toluidine | (CH₃)₂SO₄ | Bluish-red. |
| 15 | 3-amino-4-cyanopyrazole | do | (CH₃)₂SO₄ | Red. |
| 16 | do | N,N-di-β-hydroxyethyl-m-toluidine | (CH₃)₂SO₄ | Red-violet. |
| 17 | 2-amino-4-cyano-2-β-hydroxyethylpyrazole | N,N-dimethylaniline | (CH₃)₂SO₄ | Do. |
| 18 | 3-amino-4-cyano-2-β-hydroxyethypyrazole | N,β-cyanoethyl-N,β-succinimidoethyl-m-toluidine. | (CH₃)₂SO₄ | Bluish-red. |
| 19 | 3-amino-4,5-dicyano-2-phenylsulfonyl-pyrazole. | do | (CH₃)₂SO₄ | Do. |
| 20 | do | N,β-cyanoethyl-N-ethyl-m-toluidine | (CH₃)₂SO₄ | Do. |
| 21 | do | N,β-cyanoethyl-N-ethyl-aniline | (CH₃)₂SO₄ | Red. |
| 22 | 3-amino-2-phenylpyrazole-4-carboxamide | N,β-cyanoethyl-N-ethyl-m-toluidine | (CH₃)₂SO₄ | Violet. |
| 23 | do | N,N-dimethylaniline | (CH₃)₂SO₄ | Do. |
| 24 | 3-aminopyrazole-4-carboxylic acid methyl ester. | N,β-cyanoethyl-N-ethyl-m-toluidine | (CH₃)₂SO₄ | Red. |
| 25 | do | N,β-cyanoethyl-N,β-succinimidoethyl-m-toluidine. | (CH₃)₂SO₄ | Brownish-Red. |
| 26 | do | N-ethyl-N,β-hydroxy-ethyl-m-toluidine | (CH₃)₂SO₄ | Do. |
| 27 | 3-amino-2-phenylpyrazole-4-carboxylic acid methyl ester. | do | (CH₃)₂SO₄ | Red-violet. |
| 28 | do | N-β-dimethylaniline | (CH₃)₂SO₄ | Do. |
| 29 | do | N,β-cyanoethyl-N-ethyl-m-toluidine | (CH₃)₂SO₄ | Bluish-red. |
| 30 | do | N,β-cyanoethyl-N-β-succinimidoethyl-m-toluidine. | (CH₃)₂SO₄ | Red. |
| 31 | 3-amino-2-phenylsulfonyl-pyrazole-4-carboxylic acid methyl ester. | do | (CH₃)₂SO₄ | Reddish-orange. |
| 32 | do | N-ethyl-N,β-hydroxy-ethyl-m-toluidine | (CH₃)₂SO₄ | Red. |
| 33 | do | N,β-cyanoethyl-N-ethyl-m-toluidine | (CH₃)₂SO₄ | Reddish-orange. |
| 34 | 3-amino-2-phenylsulfonyl-pyrazole-4-carboxylic acid isopropyl ester. | do | (CH₃)₂SO₄ | Do. |
| 35 | do | N,N-dimethylaniline | (CH₃)₂SO₄ | Red. |
| 36 | 3-amino-4-cyanopyrazole | Diphenylamine | (CH₃)₂SO₄ | Red. |
| 37 | 3-amino-4-nitropyrazole | N,N-dimethylaniline | (CH₃)₂SO₄ | Bluish-red. |
| 38 | 3-amino-4-nitro-2-phenyl-pyrazole | do | (CH₃)₂SO₄ | Reddish-violet. |
| 39 | 3-amino-5-methyl-4-nitro-2-phenylpyrazole | do | (CH₃)₂SO₄ | Bluish-red. |
| 40 | 3-amino-4-cyano-2-methyl-pyrazole | do | (CH₃)₂SO₄ | Red. |
| 41 | do | N,β-cyanoethyl-N-ethyl-m-toluidine | (CH₃)₂SO₄ | Red. |
| 42 | 3-amino-4-cyano-2,p-nitrophenylpyrazole | N,N-dimethylaniline | (CH₃)₂SO₄ | Bluish-red. |
| 43 | 3-amino-2,p-chlorophenyl-pyrazole-4-carboxamide. | do | (CH₃)₂SO₄ | Violet. |
| 44 | 3-amino-4-cyano-2,p-tolylpyrazole | do | (CH₃)₂SO₄ | Red. |
| 45 | 3-amino-4,5-dicyano-2-methysulfonyl-pyrazole. | do | (CH₃)₂SO₄ | Red. | combined acrylonitrile units and up to about 95% acrylonitrile units, and modified, for example, by 65-5% of vinyl pyridine units as described in U.S. Pats. 2,990,393 (Re. 25,533) and 3,014,008 (Re. 25,539) or modified by 65-5% in vinylpyrrolidone units, for example, as described by U.S. Pat. 2,970,783, or modified with 65-5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the compounds of the invention are the modacrylic polymers such as described in U.S. Pat. 2,831,826 composed of a mixture of (A) 70-95% by weight of a copolymer of from 30 to 65% by weight of vinylidene chloride or vinyl chloride and 70-35% by weight of acrylonitrile, and (B) 30-5% by weight of a second polymer from the group consisting of (1) homopolymers of acrylamidic monomers of the formula $$CH_2=C-C-N\begin{matrix}R^9\\R^{10}\end{matrix}$$
$$\quad\;\;|\quad\;\;\|$$
$$\quad R^8\;\;O$$

wherein $R^8$ is selected from the group consisting of hydrogen and methyl, and $R^9$ and $R^{10}$ are selected from the group consisting of hydrogen and alkyl groups of 1-6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the compounds of the invention is an acetone soluble mixture of (A) 70-95% by weight of a copolymer of 30-65% by weight of vinylidene chloride and 70-35% by weight of acrylonitrile and (B) 30-5% by weight of an acrylamide homopolymer having the above formula wherein $R^8$, $R^9$ and $R^{10}$ are as described above. Specific polymers of that type contain 70-95% by weight of (A) a copolymer of from 30-65% by weight of vinylidene chloride and 70-35% by weight of acrylonitrile and (B) 30-5% by weight of a lower N-alkylacrylamide polymer such as poly-N-methacrylamide, poly-N-isopropylacrylamide and poly-N-tertiarybutylacrylamide.

The following example illustrates one technique by which the compounds of the invention can be used to dye acrylonitrile polymer textile material.

EXAMPLE 46

An amount of 0.1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile materials, the dyeing is carried out at the boil for one hour. In the case of materials made of "Verel" modacrylic fiber the dyebath temperature should not exceed 90° C. in order avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove.

We claim:

1. A pyrazolylazo compound having the formula $$R^1-C-\!\!-\!\!-C-R^2\qquad\qquad R^5$$
$$\;\;\|\qquad\quad\|$$
$$R^3-N\quad\;C-N=N-\!\!\!\bigcirc\!\!\!-N\begin{matrix}\\R^6\end{matrix}\;A^\ominus$$
$$\quad\;\oplus N\qquad\qquad\;(X)_n$$
$$\quad\;\;|$$
$$\quad\;R^4$$

wherein $R^1$ represents hydrogen, cyano, or lower alkyl;
$R^2$ represents cyano, carbomoyl, nitro, or lower alkoxycarbonyl;
$R^3$ represents lower alkyl or benzyl;
$R^4$ represents lower alkyl; lower hydroxyl-alkyl; phenyl; phenyl substituted with lower alkyl, lower alkoxy, chlorine, bromine, or nitro; phenylsulfonyl; or phenylsulfonyl substituted with lower alkyl, lower alkoxy, chlorine, bromine or nitro;
$R^5$ represents hydrogen; lower alkyl; or lower alkyl substituted with chlorine, bromine, hydroxy, cyano, thiocyano, lower alkoxy, lower thioalkyl, lower alkanoyloxy, lower alkoxycarbonyl, lower alkoxycarbonyloxy, lower alkylsulfonyl, lower alkylsulfonamido, carbamoyl, N-lower alkylcarbamoyl, N,N-di-lower alkylcarbamoyl, sulfamoyl, N-lower alkylsulfamoyl, N,N-di-lower alkylsulfamoyl, succinimido, phenyl, phenoxy or benzoyl;
$R^6$ represents hydrogen; lower alkyl; lower alkyl substituted with chlorine, bromine, hydroxy, cyano, thiocyano, lower alkoxy, lower thioalkyl, lower alkanoyloxy, lower alkoxycarbonyl, lower alkoxycarbonyloxy, lower alkylsulfonyl, lower alkylsulfonamido, carbamoyl, N-lower alkylcarbamoyl, N,N-di-lower-alkylcarbamoyl, sulfamoyl, N-lower alkylsulfamoyl, N,N-di-lower-alkylsulfamoyl, succinimido, phenyl, phenoxy or benzoyl; phenyl; or phenyl substituted with lower alkyl, lower alkoxy, chlorine, bromine or nitro;
X represents hydrogen, chlorine, bromine, lower alkyl, lower alkoxy, lower alkylcarbonylamino, or lower alkylsulfonamido;
$n$ represents 1 or 2; and
A represents an anion.

2. A pyrazolylazo compound according to claim 1 having the formula $$HC-\!\!-\!\!-C-R^2\qquad\qquad R^5$$
$$\|\qquad\quad\|$$
$$R^3-N\quad\;C-N=N-\!\!\!\bigcirc\!\!\!-N\begin{matrix}\\R^6\end{matrix}\;A^\ominus$$
$$\;\oplus N\qquad\qquad\;X$$
$$\quad|$$
$$\;R^4$$

wherein $R^2$ represents cyano, carbamoyl, nitro, or lower alkoxycarbonyl;
$R^3$ represents lower alkyl or benzyl;
$R^4$ represents lower alkyl or phenylsulfonyl;
$R^5$ and $R^6$ are the same or different and each represents lower alkyl or lower alkyl substituted with hydroxy, chloro, bromo, cyano, or lower alkanoyloxy;
X represents hydrogen or lower alkyl; and
A represents a bromide, chloride, iodide, lower alkyl sulfate, p-toluene sulfonate, or benzene sulfonate.

3. A pyrazolylazo compound according to claim 2 wherein $R^2$ represents cyano, carbamoyl, or lower alkoxycarbonyl;
$R^3$ represents lower alkyl; and
$R^4$ represents lower alkyl.

4. A pyrazolylazo compound according to claim 1 having the formula $$HC-\!\!-\!\!-C-CN$$
$$\|\qquad\quad\|$$
$$CH_3-N\quad\;C-N=N-\!\!\!\bigcirc\!\!\!-N(CH_3)_2\;A^\ominus$$
$$\;\;\oplus N$$
$$\quad|$$
$$\;SO_2-\!\!\bigcirc$$

5. A pyrazolylazo compound according to claim 1 having the formula

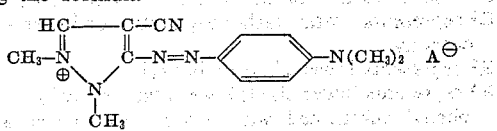

6. A pyrazolylazo compound according to claim 1 having the formula

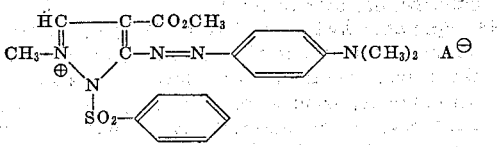

7. A pyrazolylazo compound according to claim 1 having the formula

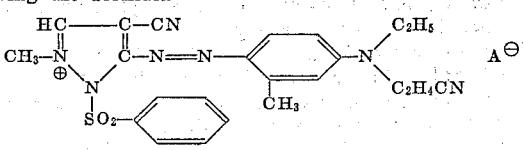

8. A pyrazolylazo compound according to claim 1 having the formula

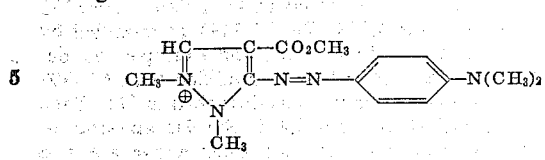

References Cited

UNITED STATES PATENTS

| | | | |
|---|---|---|---|
| 2,883,373 | 4/1959 | Bossard et al. | 260—163 XR |
| 2,893,816 | 7/1959 | Tsang et al. | 260—158 XR |
| 2,922,690 | 1/1960 | Mueller et al. | 260—158 XR |
| 3,092,615 | 6/1964 | Mingasson et al. | 260—162 XR |
| 3,148,935 | 9/1964 | Pfitzner et al. | 260—158 XR |

FLOYD DALE HIGEL, Primary Examiner

U.S. Cl. X.R.

8—41; 260—162, 310, 465.4